(12) United States Patent
Yamada et al.

(10) Patent No.: US 6,576,825 B2
(45) Date of Patent: *Jun. 10, 2003

(54) AUDIO REPRODUCTION APPARATUS FOR REPRODUCING MUSIC INFORMATION RECORDED ON A DIGITAL DISK

(75) Inventors: Youichi Yamada, Saitama-ken (JP); Tomohiko Kimura, Saitama-ken (JP); Hiroyuki Isobe, Saitama-ken (JP); Gen Inoshita, Saitama-ken (JP); Ko Atsumi, Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,239

(22) Filed: Jul. 6, 1999

(65) Prior Publication Data

US 2001/0011497 A1 Aug. 9, 2001

(30) Foreign Application Priority Data

Jul. 9, 1998 (JP) ............................................ 10-210376

(51) Int. Cl.$^7$ ................................................. G10H 7/00
(52) U.S. Cl. ....................................................... 84/602
(58) Field of Search .................. 84/601, 602, 639–643, 84/609–614, 634–638

(56) References Cited

U.S. PATENT DOCUMENTS

| 2,471,534 | A | * | 5/1949 | Muth et al. | 84/641 |
| 2,839,960 | A | * | 6/1958 | Jones | 84/640 X |
| 3,197,543 | A | * | 7/1965 | Williams | 84/639 |
| 4,768,413 | A | * | 9/1988 | Fujimori | 84/601 X |
| 5,038,660 | A | * | 8/1991 | Watanabe | 84/601 |
| 5,670,729 | A | * | 9/1997 | Miller et al. | 84/609 |
| 5,925,843 | A | * | 7/1999 | Miller et al. | 84/609 |
| 5,969,283 | A | * | 10/1999 | Looney et al. | 84/609 |

OTHER PUBLICATIONS

International Application Publication No. WO 97/01168, by André Rickli, dated Jan. 9, 1997.

Patent Abstract of Japan, Publication No. 11086446, by Yamashita Shinsuke, dated Mar. 30, 1999.

* cited by examiner

*Primary Examiner*—Jeffrey Donels
(74) *Attorney, Agent, or Firm*—Arent Fox Kintner Plotkin & Kahn

(57) ABSTRACT

Disclosed is an audio reproduction apparatus for reproducing music information recorded on a digital disk. This apparatus includes a rotatable body, a detection section for detecting a rotational state of the rotatable body, and a processing section for processing the music information to be reproduced in accordance with the rotational state detected by the detection section.

1 Claim, 11 Drawing Sheets

FIG.7
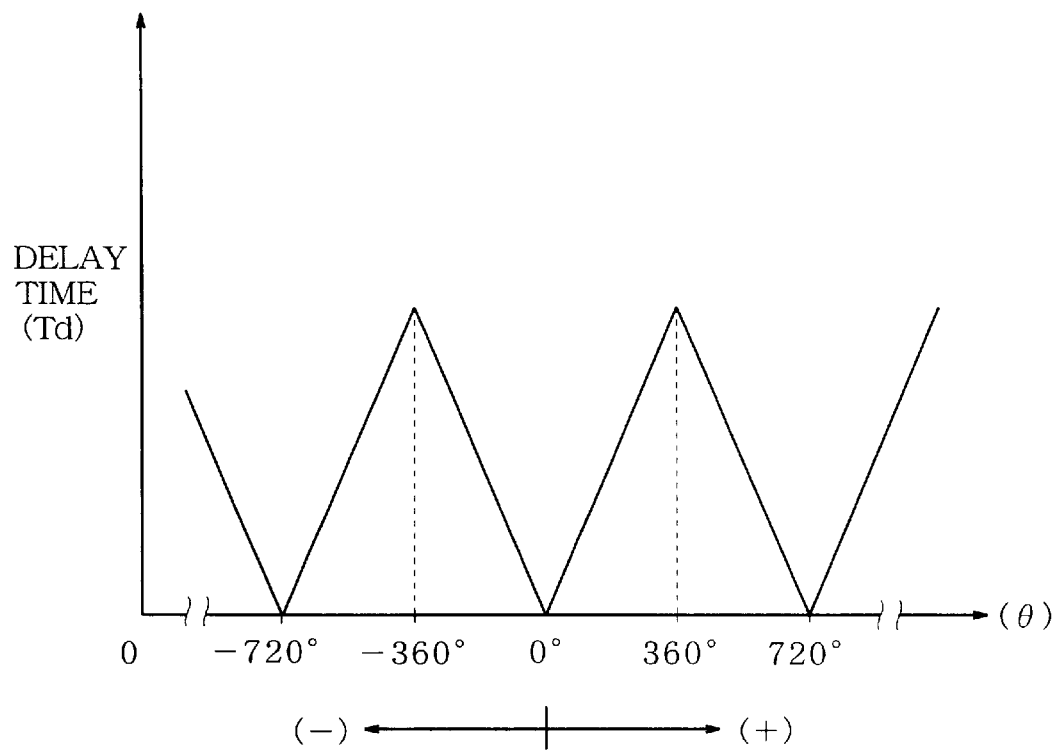
FIG.8 a
FIG.8 b
FIG.8 c
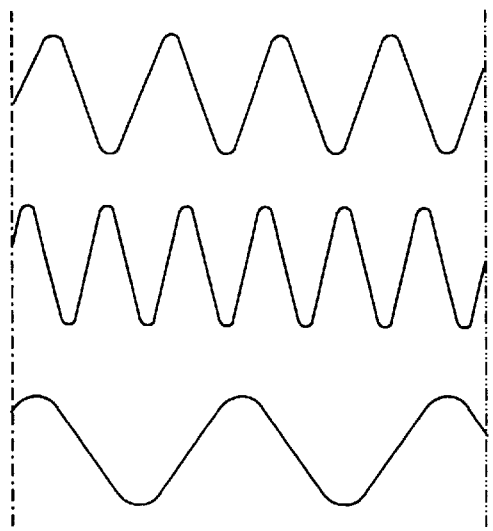

AUDIO REPRODUCTION APPARATUS FOR REPRODUCING MUSIC INFORMATION RECORDED ON A DIGITAL DISK

BACKGROUND OF THE INVENTION

The present invention relates to a system for reproducing information such as music recorded on a compact disc (CD)(hereinafter called digital disc).

In the LP record player, the tempo, pitch and tone of the reproduced music can be variously changed by manually changing the rotating speed of the turntable of the player.

For example, in a discotheque a disc jockey operates the turntable to produce the above described effect.

However, in the present time, music is generally recorded on the disc such as CD.

Since the reproducing device for the CD comprises a plurality of complicated components, it is impossible to manually change the reproducing condition unlike the LP record player.

SUMMARY OF THE INVENTION

An object of the present invention is to provide a reproducing system which may change the music reproducing condition of the digital disc.

According to the present invention, there is provided a system for reproducing music information recorded on a disc, comprising, a reproducing system for reproducing music recorded on a digital disc, having a spindle motor for rotating a turntable, a rotating dial to be rotated by a user, detecting means for detecting a rotating condition of the rotating dial, processing means responsive to a detected rotating condition for processing reproduced music.

The processing means is provided for delaying the reproduced music information in accordance with the detected rotating condition, and for changing the pitch of the reproduced music information in accordance with the detected rotating condition, and for changing a frequency range of the reproduced music information in accordance with the detected rotating condition.

The processing means is provided for returning a processed music information to an initial condition when the rotating dial is stopped.

The rotating condition comprises an amount of rotation and rotating direction.

The delaying operation comprises the repeating of the increasing and reducing of the delay time.

The pitch is changed by changing the rotating speed of the spindle motor.

The frequency range is changed by shifting a frequency range of a band pass filter.

These and other objects and features of the present invention will become more apparent from the following detailed description with reference to the accompanying drawings.

BRIEF DESCRIPTION OF DRAWINGS

FIG. 7 is a graph showing the relationship between the amount θ of the rotation and the delay time of the JOG dial.

FIGS. 8a to 8c are waveforms showing the changing of the pitch.

DETAILED DESCRIPTION OF THE PREFERRED EMBODIMENT

Figure 1:
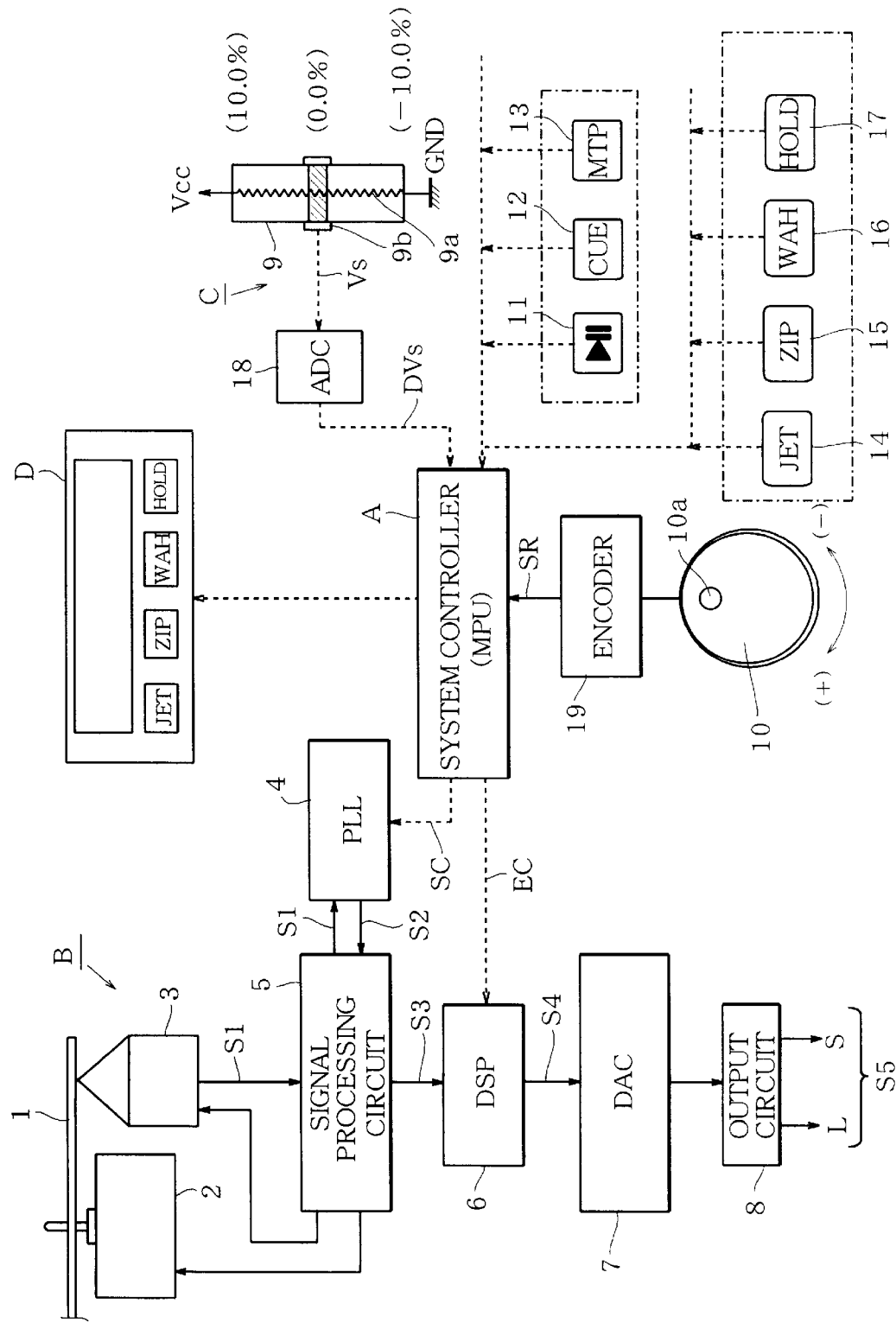
FIG. 1 is a block diagram showing a reproducing system according to an embodiment of the present invention.

Referring to FIG. 1, the reproducing system of the present invention comprises a system controller A for controlling the whole of the system, a reproducing system B, a manipulating section C and a display D.

The system controller A has a microprocessor unit (MPU) For performing a system program, and controls the reproducing system B and display D in accordance with the user's operation of the manipulating section C.

The reproducing system B comprises a spindle motor 2 for rotating a CD 1, a pickup 3, a PLL (phase-locked loop) 4, a signal processing circuit 5, a digital signal processor (DSP) 6, a D/A converter 7, and an output circuit 8.

The PLL 4 derives a synchronizing signal from a reproduced RF signal S1 and produces a synchronizing clock S2 for reproducing which synchronizes the former synchronizing signal with the frequency and phase designated by a speed control signal SC fed from the system controller A.

The signal processing circuit 5 produces a spindle servo control signal, focus servo control signal, and tracking servo control signal based on the synchronizing clock S2, and thereby the spindle motor 2 and the pickup 3 are controlled.

Furthermore, the signal processing circuit 5 produces an audio-data S3 by separating a frame synchronizing pattern from the reproduced RF signal S1, and by processing the EFM (Eight to Fourteen Modulation) decoding, error correction and others, and feeds the audio-data to the digital signal processor 6.

The digital signal processor 6 processes the audio-data S3 in accordance with an effect control signal EC to produce a converting audio-data S4 which is applied to the D/A converter 7 to convert the signal to an analogue signal. Thereby the output circuit 8 produces an analogue audio signals S5.

In the operating section C, there is provided a volume 9 comprising a slide resistor 9a and a slide knob 9b, and JOG dial 10, and a JOG push buttons 11 through 17.

The slide resister 9a is connected between a source Vcc and a ground GND. The volume 9 outputs a divided voltage Vs in accordance with the position of the slide knob 9b. An A/D converter 18 converts the voltage Vs to a digital data DVs which is applied to the system controller A.

The system controller A applies a speed control signal SC having a frequency and phase corresponding to the digital data DVs to the PLL circuit 4. The PLL circuit 4 produces the synchronizing clock S2 based on the speed control signal SC. The signal processing circuit 5 controls the spindle motor 2 and the pickup 3 in accordance with the synchronizing clock S2. Thereby the rotating speed of the CD 1 is controlled in dependency on the position of the knob 9b.

When the knob 9b is positioned at a home position shown in FIG. 1, the rotating speed of the CD 1 is set at the ordinary speed, and the speed increases toward the ground and reduces toward the Vcc.

The changing range of the rotating speed is ±10% of the ordinary rotating speed.

The JOG dial 10 has a recess 10a for indicating the angular position of the dial 10.

Under the JOG dial 10, an optical pulse encoder 19 is provided for detecting the angular speed, amount of rotation, and rotating direction of the JOG dial 10 to produce detected signals SR which is fed to the system controller A.

Figure 2:
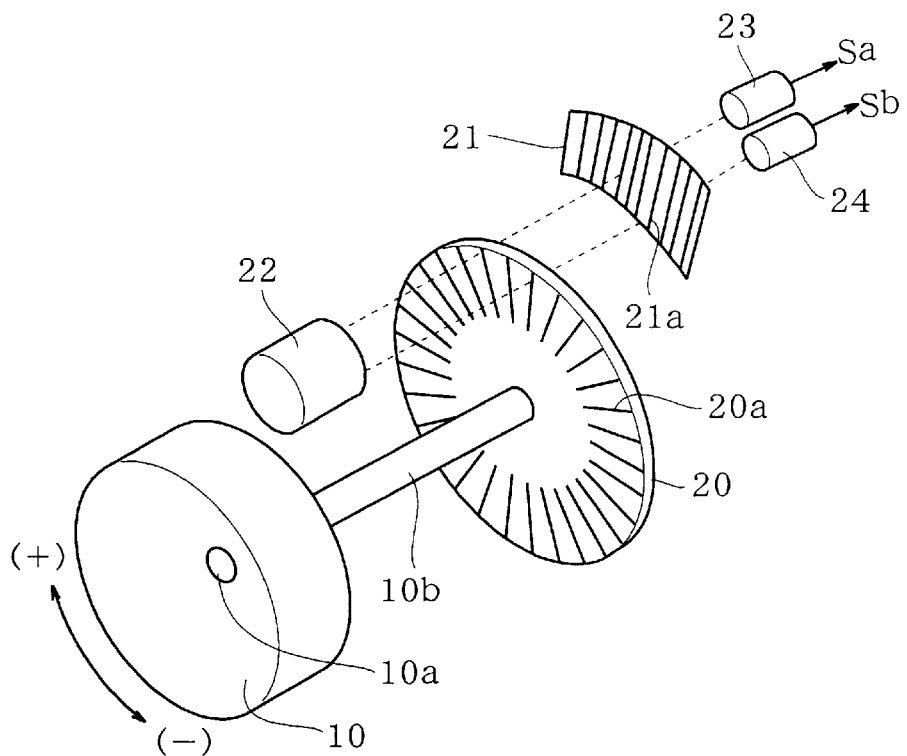
FIG. 2 is a perspective view of a pulse encoder.

Referring to FIG. 2 showing the pulse encoder 19, the pulse encoder comprises a rotating circular plate 20 fixed to a rotating shaft 10b of the JOG dial 10, a fixed plate 21 opposite to the circular plate 20, and a light emitting element 22 and light receiving elements 23 and 24 opposite to the light emitting element 22, interposing the rotating plate 20 and the fixed plate 21.

Figure 3:
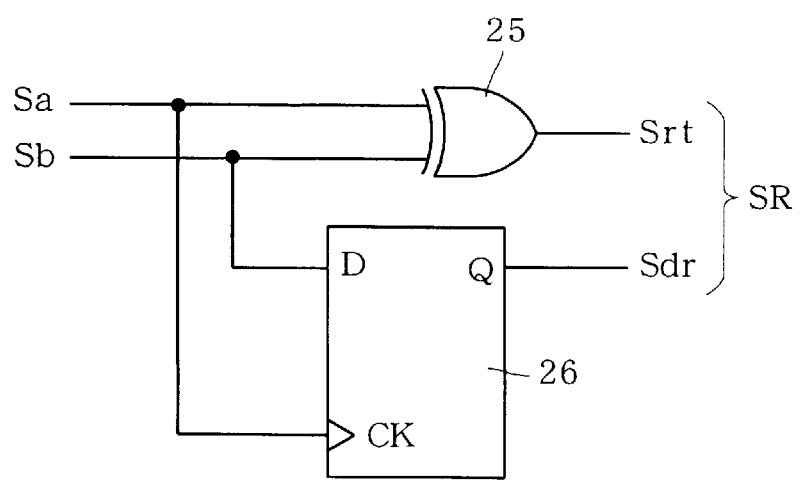
FIG. 3 is a rotating condition detecting circuit.

The encoder 19 has a circuit shown in FIG. 3, which comprises an EXOR gate 25 and a D-type flip-flop 26 which are connected to output terminals of the light receiving elements.

There are provided a plurality of slits 20a circularly formed in the rotating plate 20, and a plurality of slits 21a formed in the fixed plate 21, each corresponding to an opposite slit 21a.

The light receiving elements 23, 24 receive light beams passing through slits 20a and 21a and the circuit of FIG. 3 produces the signal SR comprising a rotating direction signal Sdr and an angular speed signal Srt as described hereinafter in detail.

Figure 4:
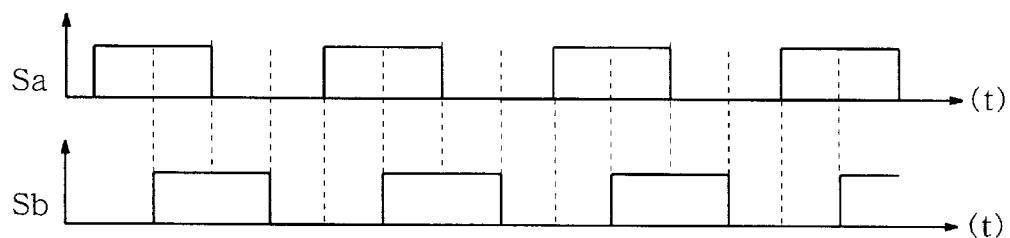
FIG. 4 is a timing chart showing detected signals of light receiving elements.

FIG. 4 shows a timing chart showing detected signals Sa and Sb of the light receiving elements 23, 24.

Figure 5:
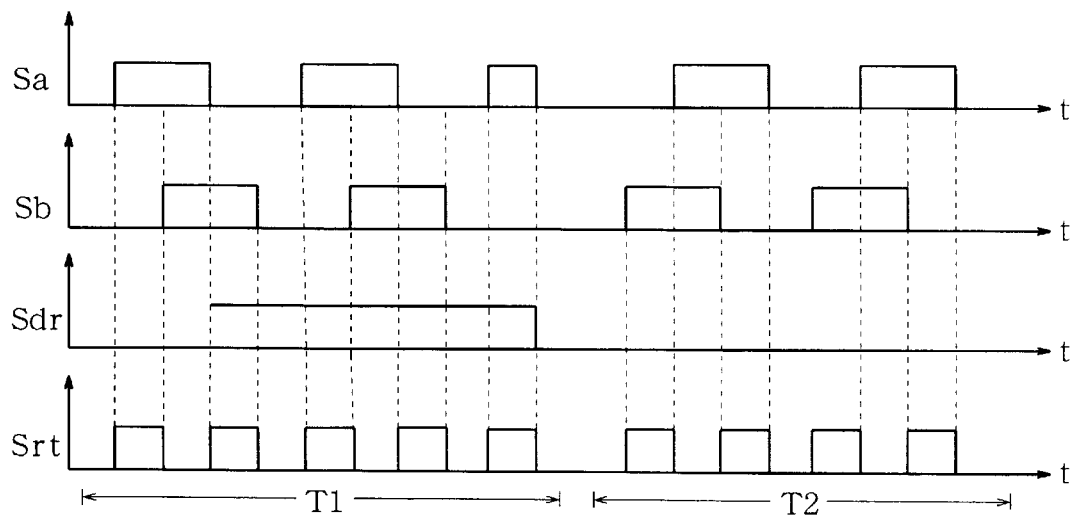
FIG. 5 is a timing chart showing the signals.

FIG. 5 shows a timing chart showing the signals Sa, Sb, Sdr and Srt.

When the JOG dial 10 is rotated in the clockwise direction (+), the signal Sa generates earlier than the signal Sb. When the JOG dial 10 is rotated in the counterclockwise direction, the signal Sb generates earlier than the signal Sa. Consequently, the rotating direction signal Sdr is "0" in the clockwise direction, and the direction signal Sdr is "1" in the counterclockwise direction. The angular speed dependent on the speed signal Srt is detected by counting the number of the output "1" of the EXOR gate 25.

Referring back to FIG. 1, the push button 11 is a start button, push button 12 is a cue button for designating a start position, and the button 13 is a master tempo button. When the button 13 is pushed, if the rotating speed is changed by operating the knob 9b, the pitch of the reproduced music does not change.

The button 14 is a JET effect button for generating a sound like a jet plane by operating the JOG dial 10, the button 15 is a ZIP effect button for changing the pitch of the reproduced music in accordance with the operation of the JOG dial 10. The button 16 is a WAH effect button for increasing or decreasing the volume of a high frequency or low frequency range of the reproduced sound in accordance with the operation of the JOG dial 10. The button 17 is a HOLD effect button. When the button 17 is depressed, the reproducing conditions by the buttons 14, 15, 16 are held, and when the button is not operated, the reproducing conditions gradually return to original conditions.

The composition for producing above described effects with the buttons 14 through 17 is described hereinafter with reference to FIGS. 6 to 11.

Figure 6:
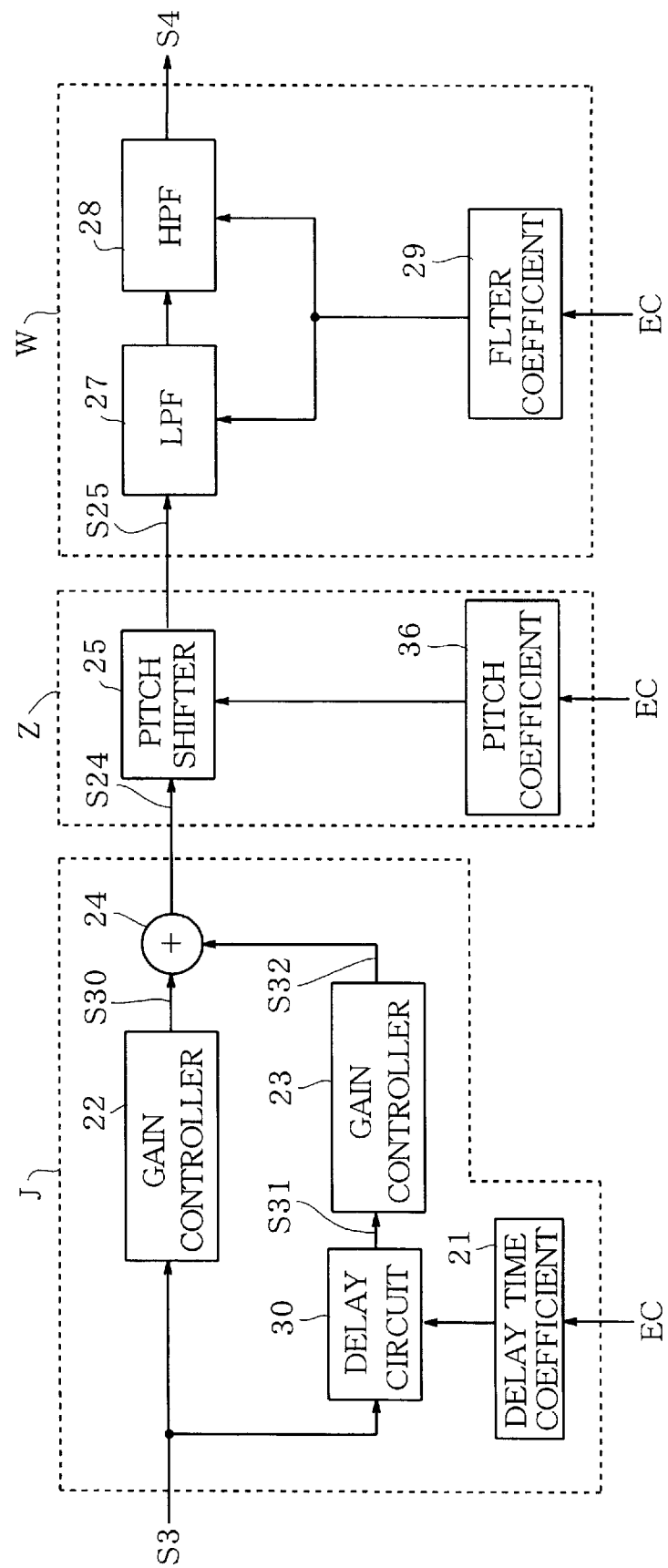
FIG. 6 is a block diagram of an effect producing system.

Referring to FIG. 6, a JET effect producing system J operated by the JET button 14 comprises a delay circuit 30 for delaying the audio data S3 from the signal processing circuit 5, a delay time coefficient circuit 31 for setting a delay time Td for the delay circuit 30, a gain control circuit 32 for reducing the audio data S3 to a half level, a gain control circuit 33 for reducing the delayed audio data S31 to a half level, and an adder 34 for adding audio data S30 and S32 from gain control circuits 32 and 33.

The delay circuit 30 delays the audio data by the delay time Td in accordance with a coefficient fed from the delay time coefficient circuit 31 when the JET button 14 is depressed.

The delay time coefficient circuit 31 stores delay time coefficient designated by the control signal EC from the system controller A.

The system controller A is adapted to produce the control signal EC as the delay time coefficient data in accordance with the amount θ of rotation and rotating direction of the JOG dial 10.

FIG. 7 is a graph showing the relationship between the amount θ of rotation and the delay time Td of the JOG dial 10. The delay time Td increases and decreases at every 720° rotation of the JOG dial 10 in plus and minus directions.

By adding the delayed audio data S32 and the not delayed data S30, a modulated audio data S24 is produced (FIG. 6), thereby producing sounds like sounds of the jet plane.

Referring to FIG. 6, a ZIP effect producing system Z operated by the ZIP button 15 comprises a pitch shifter 35 receiving the audio data S24 from the adder 34, and a pitch coefficient circuit 36.

The system controller A applies a pitch coefficient data to the pitch coefficient circuit 36 by the control signal in accordance with the amount θ of rotation and the rotating direction of the JOG dial 10.

The pitch shifter 35 changes the pitch Hp of the audio data S24 based on the pitch coefficient fed from the pitch coefficient circuit 36.

FIG. 8 shows waveforms for the changing of the pitch. FIG. 8a shows an original pitch of the audio data S24, FIG. 8b shows increased pitch in the clockwise direction of the JOG dial 10, and FIG. 8c shows reduced pitch in the counterclockwise direction.

Figure 9:
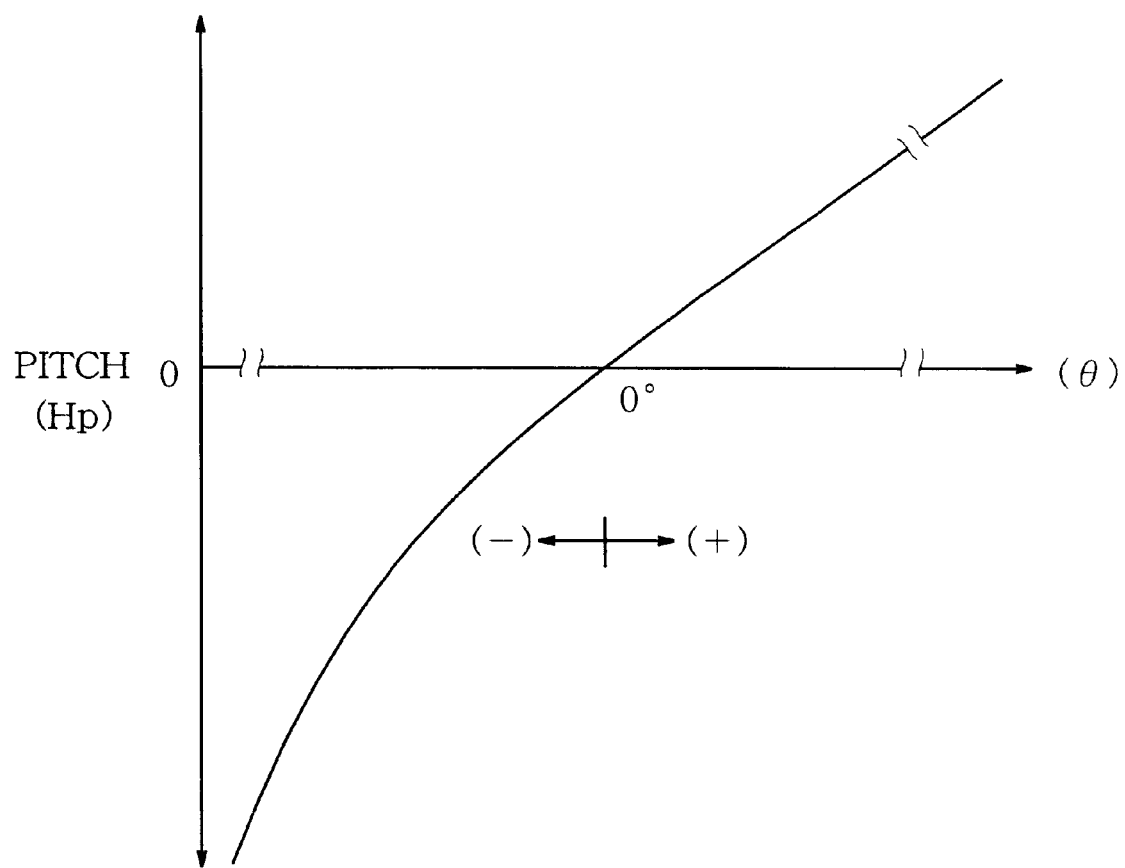
FIG. 9 is a graph showing the relationship between rotating direction of the JOG dial.

FIG. 9 is a graph showing the relationship between the rotating direction of the JOG dial 10. When the JOG dial 10 is rotated in the clockwise direction (+), the pitch increases 1 octave at every predetermined amount θ, and when the JOG dial is rotated in the counterclockwise direction (−), the pitch reduces 1.5 octave at every amount θ.

Referring to FIG. 6, a WAH effect producing system W with the WAH button 16 comprises a low pass filter 27 which can change a cutoff frequency fCH of a high frequency range, a high pass filter 28 which can change a cutoff frequency fCL of a low frequency range of an audio data S25, and a filter coefficient circuit 29.

The system controller A applies a filter coefficient data to the filter coefficient circuit 29 based on the amount θ and the rotating direction of the JOG dial 10.

Figure 10:
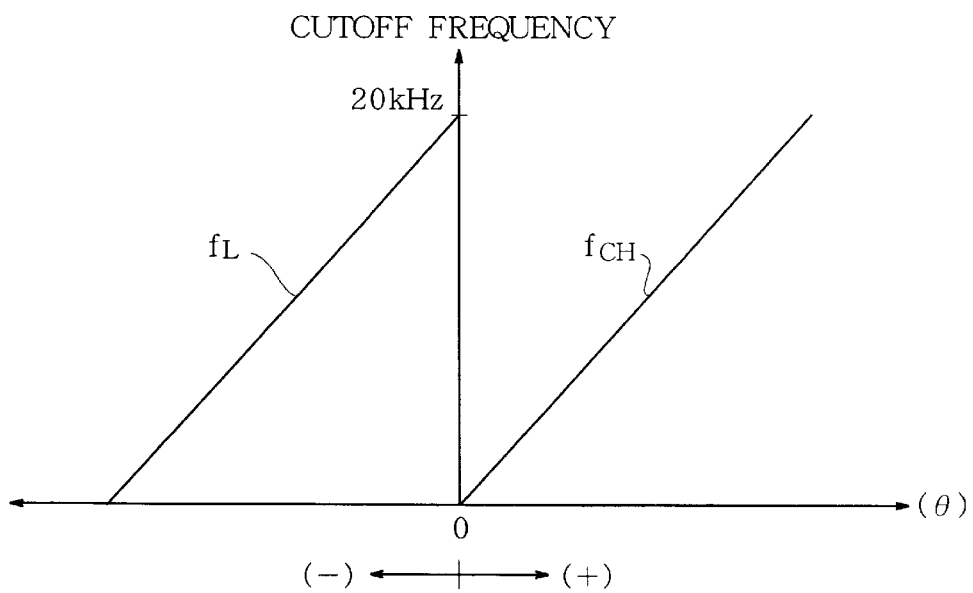
FIG. 10 is a graph showing the relationship between the amount θ of rotation and the cutoff frequency.
Figure 11:
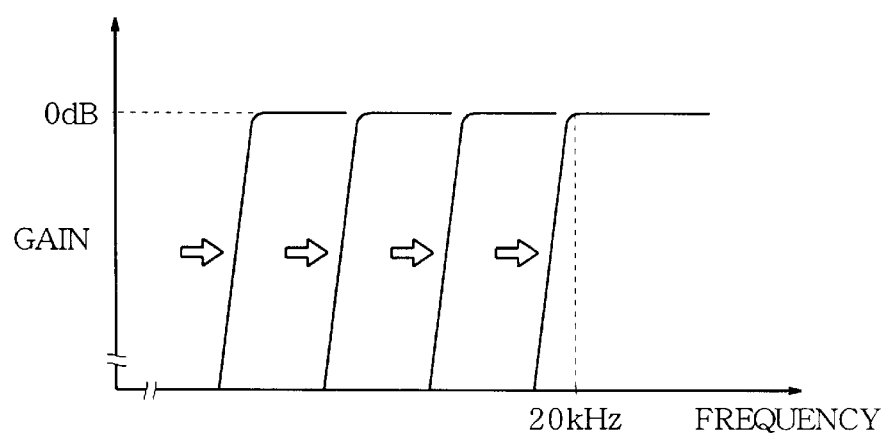
FIGS. 11a and 11b are graphs showing the change of band pass filter ranges.
Figure 11:
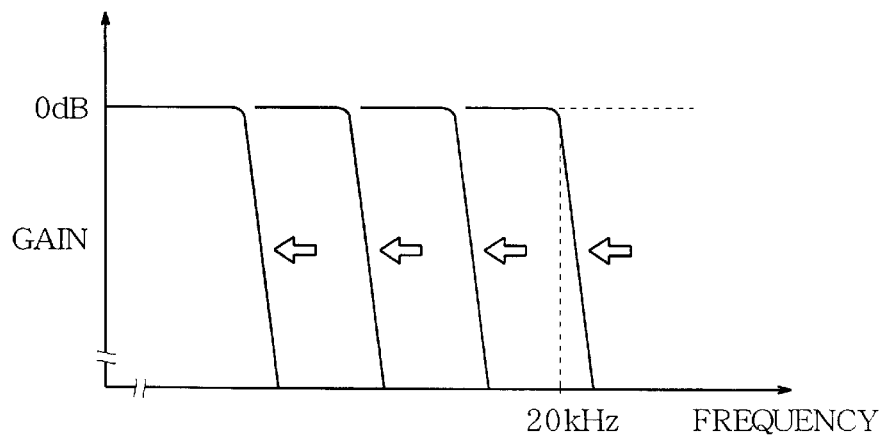

FIG. 10 is a graph showing the relationship between the amount θ of the rotation and the cutoff frequency.

When the JOG dial 10 is rotated in the clockwise direction, increases with the amount θ of rotation. When the JOG dial is rotated in the counterclockwise direction the cutoff frequency fCH gradually decreases with the amount θ.

FIGS. 11a and 11b show shifting conditions of the cutoff frequencies fCH, fCL. When the rotation of the JOG dial 10 is stopped, the cutoff frequency is shifted toward a condition passing through the filter.

The operation of the system will be described hereinafter with reference to FIGS. 12 through 15.

Figure 12:
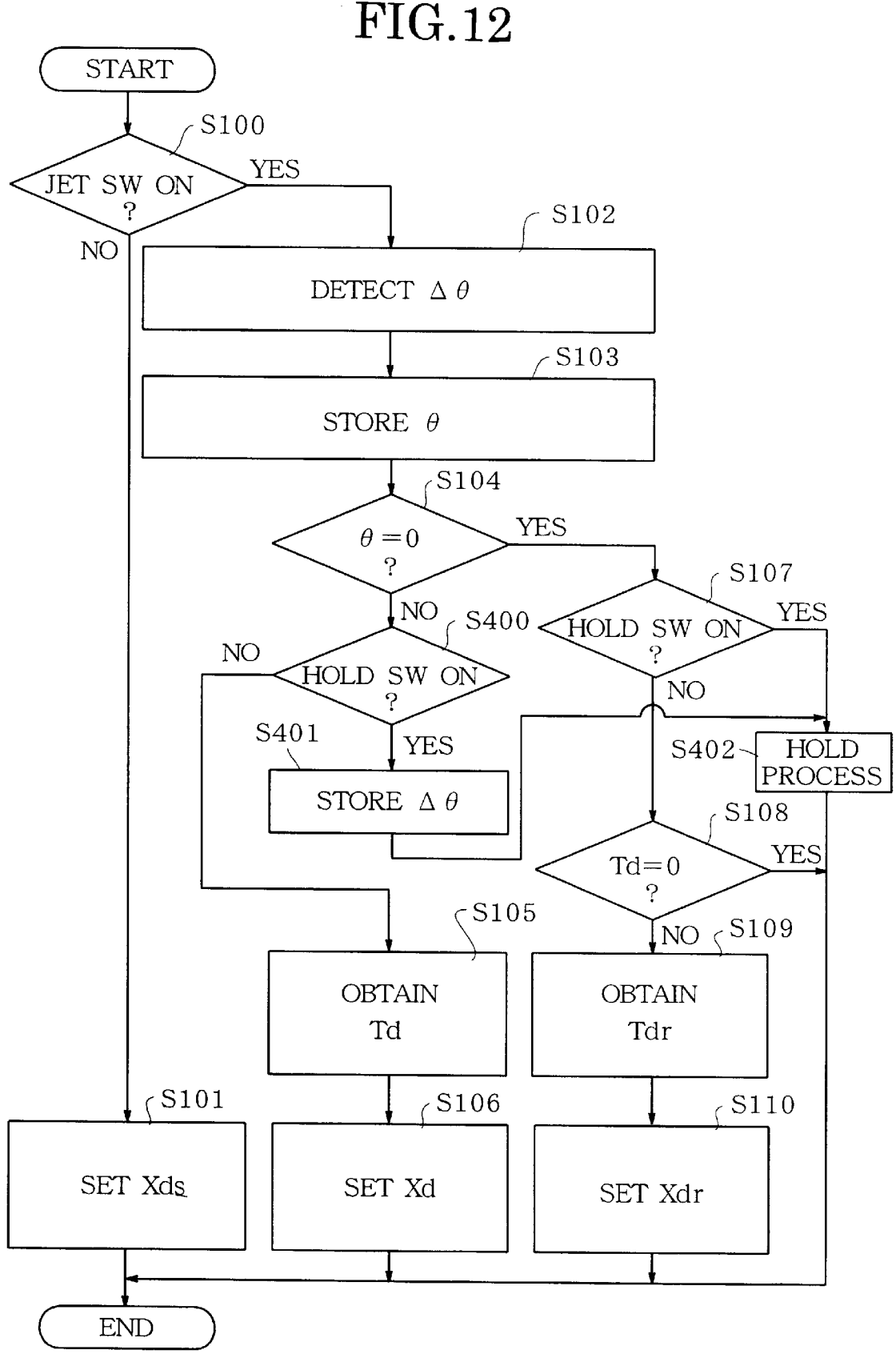
FIGS. 12 through 15 are flowcharts showing operation of the system.

Referring to FIG. 12, at a step S100 it is determined whether JET effect button 14 is depressed. When the button is not depressed, the delay coefficient Xds corresponding to the delay time Td=0 is fed to the digital signal processor 6 (step S101).

If yes, the amount Δθ of the rotation of the JOG dial for a predetermined time is detected at the pulse encoder 19 at a step S102. The amount θ of the rotation is stored in a memory (step S103). At a step S104, it is determined whether the amount θ is zero. If no, and the HOLD effect button 17 is depressed (step S400), the amount Δθ is stored in a memory (step S401), and a hold process is carried out (step S402). If the HOLD effect button is not depressed at the step 400, a delay time Td corresponding to the amount θ is obtained (step S105), and a delay time coefficient Xd corresponding to the delay time Td is set (step S106).

When the amount θ is zero at the step S104, it is determined whether the HOLD effect button is depressed at a step S107. If the button is not depressed and the delay time is not zero at a step S108, a time Tdr necessary to make the delay time Td zero is calculated (S109). A delay time coefficient Xdr corresponding to the delay time Tdr is fed to the digital signal processor 6 (step S110).

Figure 13:
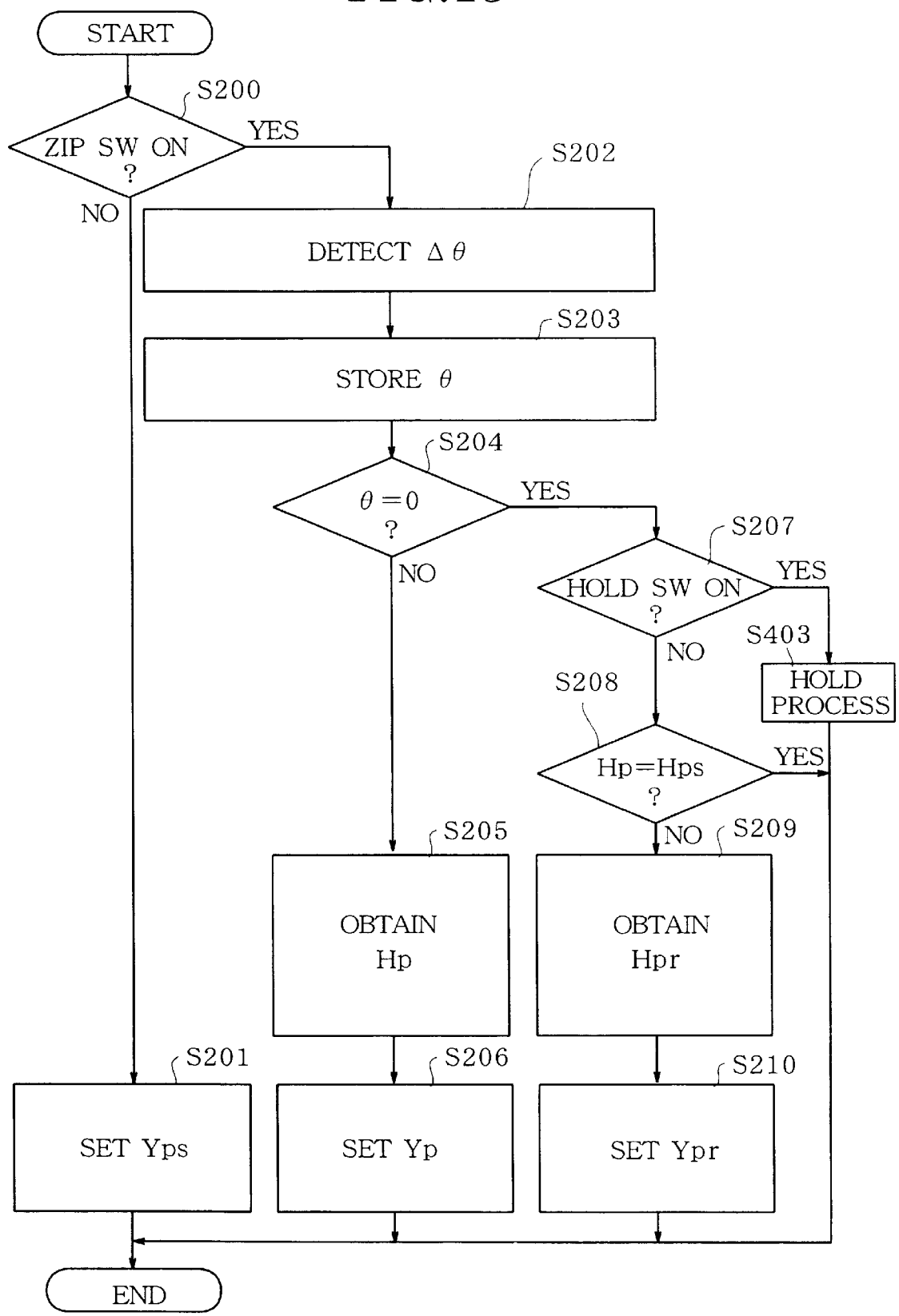

Referring to FIG. 13, at a step S200, it is determined whether the ZIP effect button 15 is depressed. When the button is not depressed, a pitch coefficient Yps corresponding to an initial pitch Hps is fed to the digital signal processor 6 (step S201).

If yes, the amount Δθ of the rotation of the JOG dial for a predetermined time is detected at the pulse encoder 19 at the step S202. The amount θ of the rotation is stored in a memory (step S203). At a step S204, it is determined whether the amount θ is zero. If no, a pitch Hp corresponding to the amount θ is obtained (step S205). A pitch coefficient Yp corresponding to the pitch Hp is obtained and is set (step S206).

When the amount θ is zero, it is determined whether the HOLD effect button is depressed at a step S207. If the button is not depressed, and the pitch Hp is not equal to the initial pitch Hps at a step S208, a return pitch Hpr necessary to make the pitch Hp the initial pitch Hps is calculated (step S209). A pitch coefficient Ypr corresponding to the pitch Hpr is fed to the digital signal processor 6 (step S210).

Figure 14:
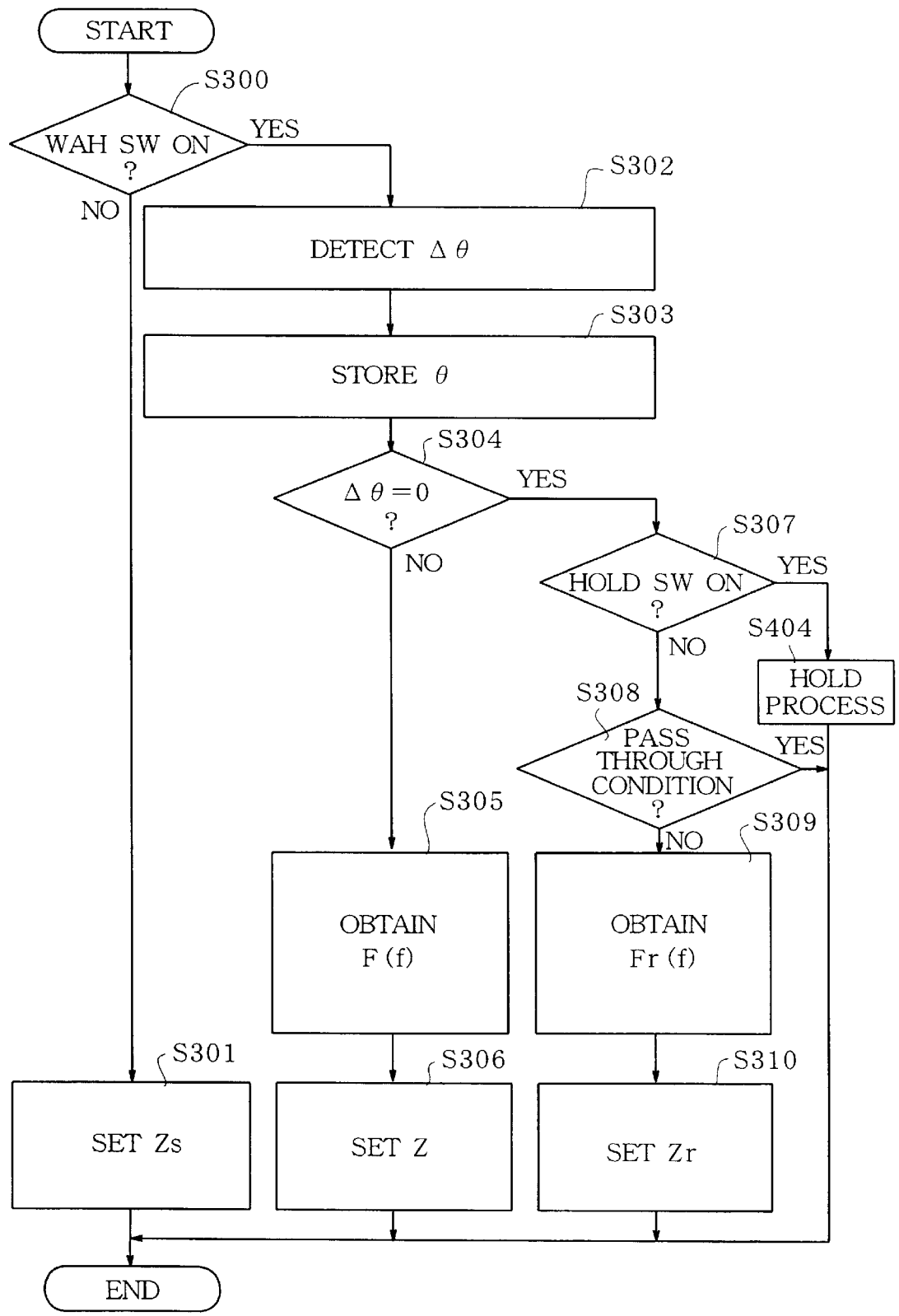

Referring to FIG. 14, at a step S300 it is determined whether WAH effect button 16 is depressed. When the button is not depressed, the filter coefficient Zs for making the filters to passing through conditions Fs(f) is fed to the digital signal processor 6 (step S301).

If yes, the amount θ of the rotation of the JOG dial for a predetermined time is detected at the pulse encoder 19 at a step S302. The amount θ of the rotation is stored in a memory (step S303). At a step S304, it is determined whether the amount θ is zero. If no, a filter characteristic F(f) corresponding to the amount θ is obtained (step S305), and a filter coefficient Z corresponding to the filter characteristic F(f) is set (step S306).

When the amount θ is zero at the step S304, it is determined whether the HOLD effect button 17 is depressed at a step S307. If the button is not depressed and the filters are not in passing through conditions at a step S308, a return filter characteristic Fr(f) necessary to make the filter characteristic F(f) to the passing through conditions Fs(f) is calculated (step S309). A filter coefficient Zr corresponding to the filter characteristic Fr(f) is fed to the digital signal processor 6 (step S310).

Figure 15:
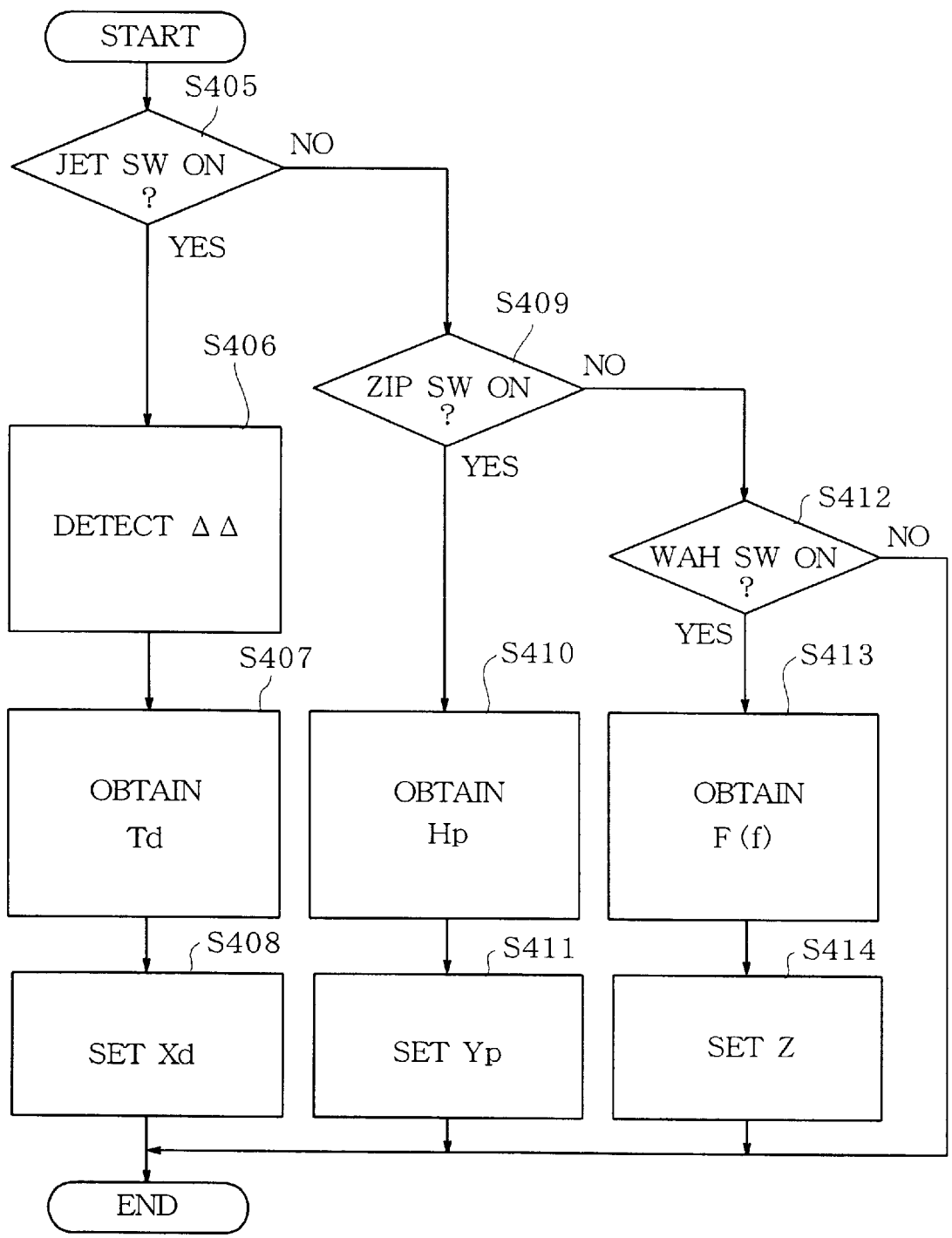

Referring to FIG. 15, at a step S405, it is determined whether JET effect button 14 is depressed. When the button is not depressed, it is determined whether the ZIP effect button 15 is depressed at a step 409.

If the button 14 is depressed, the amount Δθ of the rotation of the JOG dial for a predetermined time is detected at the pulse encoder 19 and the amount θ of the rotation is stored in a memory (step S406). A delay time Td corresponding to the amount θ is obtained (step S407), and a delay time coefficient Xd corresponding to the delay time Td is set (step S408). When the ZIP effect button 15 is depressed, a pitch Hp corresponding to the amount θ is obtained (step S410).

A pitch coefficient Yp corresponding to the pitch Hp is obtained and set (step S411).

When the WAH effect button 16 is depressed at a step S412, a filter characteristic F(f) corresponding to the amount θ is obtained (step S413), and a filter coefficient Z corresponding to the filter characteristic F(f) is set (step S414).

From the foregoing, it will be understood that it is possible to change the reproduced music to various moods only by rotating the dial.

While the invention has been described in conjunction with preferred specific embodiment thereof, it will be understood that this description is intended to illustrate and not limit the scope of the invention, which is defined by the following claims.

What is claimed is:

1. An audio reproduction apparatus for reproducing music information recorded on a digital disc, comprising:

a motor for rotating said digital disc;

a rotating device to be rotated arbitrarily by a user;

detection means for detecting a rotational state of said rotating device, said rotational state including an amount of rotation and rotating direction;

a reproducing means for reproducing music information recorded on the digital disc; and processing means for processing said music information reproduced by said reproducing means in accordance with said rotational state detected by said detection means, wherein said rotation device is a jog dial.

* * * * *